(12) United States Patent
Certain et al.

(10) Patent No.: US 8,438,247 B1
(45) Date of Patent: May 7, 2013

(54) TECHNIQUES FOR CAPTURING DATA SETS (75) Inventors: Tate Andrew Certain, Seattle, WA (US); Sachin Jain, Sammamish, WA (US); James R. Hamilton, Seattle, WA (US); Fiorenzo Cattaneo, Snoqualmie, WA (US); Danny Wei, Seattle, WA (US); David N. Sunderland, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 167 days.

(21) Appl. No.: 12/975,269

(22) Filed: Dec. 21, 2010

(51) Int. Cl.
*G06F 15/16* (2006.01)
(52) U.S. Cl.
USPC ............................ 709/219; 709/203; 709/223
(58) Field of Classification Search .......... 709/217–219, 709/203, 223
See application file for complete search history.

(56) References Cited

U.S. PATENT DOCUMENTS

| | | | |
|---|---|---|---|
| 2003/0186715 A1* | 10/2003 | McGowan | 455/509 |
| 2003/0217119 A1* | 11/2003 | Raman et al. | 709/219 |
| 2004/0073831 A1 | 4/2004 | Yanai et al. | |
| 2005/0240632 A1 | 10/2005 | Wong et al. | |
| 2006/0005074 A1* | 1/2006 | Yanai et al. | 714/5 |
| 2006/0136932 A1* | 6/2006 | Bose et al. | 719/314 |
| 2006/0161732 A1 | 7/2006 | Murotani et al. | |
| 2007/0260830 A1* | 11/2007 | Faibish et al. | 711/162 |
| 2008/0140910 A1* | 6/2008 | Flynn et al. | 711/100 |
| 2008/0162812 A1* | 7/2008 | Stroberger et al. | 711/114 |
| 2011/0138138 A1* | 6/2011 | Ben-Dor et al. | 711/162 |

OTHER PUBLICATIONS

International Search Report and Written Opinion mailed Apr. 20, 2012 in Application No. PCT/US2011/65869 filed Dec. 19, 2011.

* cited by examiner

*Primary Examiner* — Philip B Tran
(74) *Attorney, Agent, or Firm* — Kilpatrick Townsend & Stockton, LLC (57) ABSTRACT

Techniques, including systems and methods, for capturing data sets include performing a client-side two-phase commit to ensure one or more data consistency conditions. A logical volume may represent a data set that is distributed among a plurality of physical storage devices. One or more client devices are instructed to block at least acknowledgment of write operations. When the one or more client devices have blocked at least acknowledgment of write operations, one or more servers in communication with the physical storage devices are instructed to capture corresponding portions of the data set. When the servers have been instructed to capture corresponding portions of the data set, the client devices are instructed to resume at least acknowledgment of write operations.

29 Claims, 7 Drawing Sheets

TECHNIQUES FOR CAPTURING DATA SETS

BACKGROUND

Networked computing environments continue to grow in terms of both the number and type of computing components, as well as the complexity of component arrangements in the computing environments. Some such computing environments offer virtualized computing services decoupled to various degrees from the underlying computing hardware that ultimately implement the computing services. There are various advantages to such virtualization for both users and providers of virtualized computing services. For example, virtualized computing service users may quickly (e.g., on the order of minutes or seconds) add virtual computing resources in response to increased demand and, just as quickly, release the virtual computing resources for other purposes if demand falls. Such flexibility for users of virtualized computing services can entail both challenges and opportunities for providers of virtualized computing services.

A virtualized block device is an example of a virtualized computing service. Users of virtualized file system volumes ("virtual volumes") may create, delete, resize and otherwise reconfigure virtual volumes without concern for the details of how underlying computing resources are allocated. Users may also capture data sets stored in a virtual file system, where a capture of a data set is a representation of a data set at a moment in time. Multiple captures of a particular data set may be taken at various moments in time, and later captures may depend on one or more earlier captures. For example, an initial capture of the data set may involve making a full copy of the data set, whereas a later capture of the data set may involve copying data that has changed since an earlier capture. When needed for various reasons, captures may be reconstituted into volumes. Often, in order for a capture to be useful when reconstituted into a volume, it must satisfy certain properties with respect to an input/output request pattern. For example, captures may only be useful if it can be guaranteed or at least assured that, if a write is present in a capture, all writes that were confirmed before that write was submitted are also be in the capture. In some instances, such conditions may be relatively straightforward to implement. In other instances, such as when partitioning a volume across multiple servers, care must be taken to maintain this property if the two writes in question are going to different servers.

BRIEF DESCRIPTION OF THE DRAWINGS

Various embodiments in accordance with the present disclosure will be described with reference to the drawings, in which.

DETAILED DESCRIPTION

Techniques described and suggested herein include systems and methods for managing aspects of data set capture. In an embodiment, a logical volume is partitioned among a plurality of physical volumes, where the logical volume is a representation of a data set that is physically stored in a distributed manner among the physical volumes. The physical volumes may be stored by corresponding physical storage devices, such as hard drives or other storage devices, and may be accessed through communication with a plurality of servers. Each physical volume, for example, may be served by at least one corresponding server. A client application executing on a client device may send instructions for accessing data to the servers and the servers may access the data according to the instructions. For example, the client may send an instruction to perform a write operation and a server that receives the instruction may cause the write operation to be performed, and send an acknowledgment that the operation was performed to the client operation. Communications between the client device and each of the servers may travel through one or more intermediate computing or networking devices. For example, the client device may send instructions for performing data operations to another device which operates at least as a multiplexer, receiving instructions from the client device and transmitting the instructions to appropriate servers. In this manner, the client application and client device may operate without maintaining a record of where among the physical volumes particular portions of the data set are stored.

In an embodiment, captures of the data set are taken, where, as noted, a capture of a data set is a representation of the data set at a moment in time. Multiple captures of a particular data set may be taken at various moments in time, and later captures may depend on one or more earlier captures. For example, an initial capture of the data set may involve making a full copy of the data set, whereas a later capture of the data set may involve copying data that has changed since an earlier capture. In various embodiments described herein, captures of the data set are taken in a manner that guarantees that if a write is present in a capture, then all writes that were confirmed or acknowledged before that write was submitted are also in the capture. In this manner, captures are taken in a manner that ensures that, if a write is dependent on an earlier write and the write is in a capture, then both the write and the earlier write will be in the capture. In other words, if an application made two writes, one dependent on the other, a capture will either include both writes or neither of the writes, thereby avoiding a logical inconsistency where a write is in a capture but not another write from which the write depends.

In an embodiment, the above guarantee is provided using a client-side two-phase commit. At a time when a capture is to be taken of the data set, such as upon receipt of an instruction to perform a capture, one or more client devices are instructed to block acknowledgments of completion of write operations. Blocking acknowledgment of completion of write operations may be performed in any suitable manner including, but not limited to, suspending issuance of information acknowledgment of write operations and/or postponing issuing write requests. Blocking acknowledgment of completion of write operations may also include blocking acknowledgment of other operations, such as read operations, by suspending issuance of acknowledgments and/or postponing issuance of new requests to perform the operations. The one or more client devices may be any device that communicates with any of the servers serving physical volumes among which the logical volume is distributed. For example, a client device may be a device that receives instructions from an application executing on another device and that distributes the instructions to appropriate servers. A client device may also be the device on which the application is executing or, generally, any device involved in communication with one or more servers that serve one or more physical volumes in order to participate in processing and/or acknowledgment of write operations for data in the logical volume. The one or more client devices may also be instructed to suspend other activities, such as all operations on data in the data set.

When the one or more client devices have suspended activities as instructed, servers serving physical volumes of the logical volume are instructed to take a capture of corresponding portions of the data set. In an embodiment, instructing the servers is accomplished by inserting a token into a request stream to each of the servers, where a request stream is a sequence of requests to perform operations in the data set that informs a corresponding server to perform requested operations according to the sequence. A token is any information that informs a server to perform a capture of a portion of a data set in a volume served by the server. In embodiments where requests to perform data operations generated by execution of an application pass through multiple devices before reaching an appropriate server, the token may be inserted into a request stream of requests sent from any of the devices. In an embodiment, the token is inserted into a request stream of requests sent from a multiplexer that sends instructions to appropriate servers. When each server receives the token (or other indication that a capture should be taken), the server takes a capture of a physical volume that the server serves. The server may send the capture to another data store for storage. Also, in an embodiment, when each server receives the token (or other indication that a capture should be taken), the one or more client devices are instructed to resume processing of the suspended activities.

Figure 1:
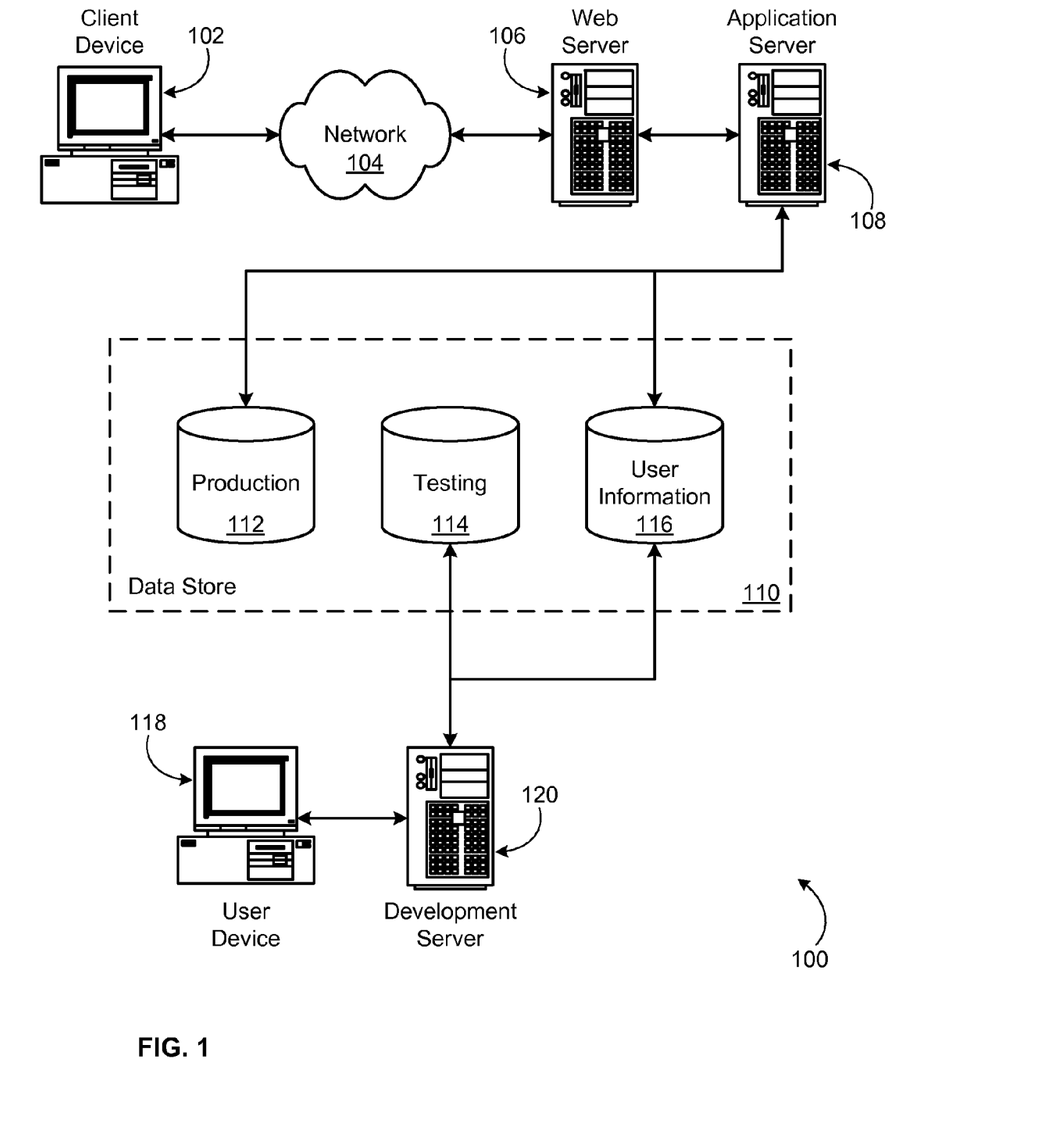
FIG. 1 is a schematic diagram illustrating aspects of an example environment for implementing aspects in accordance with an embodiment.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
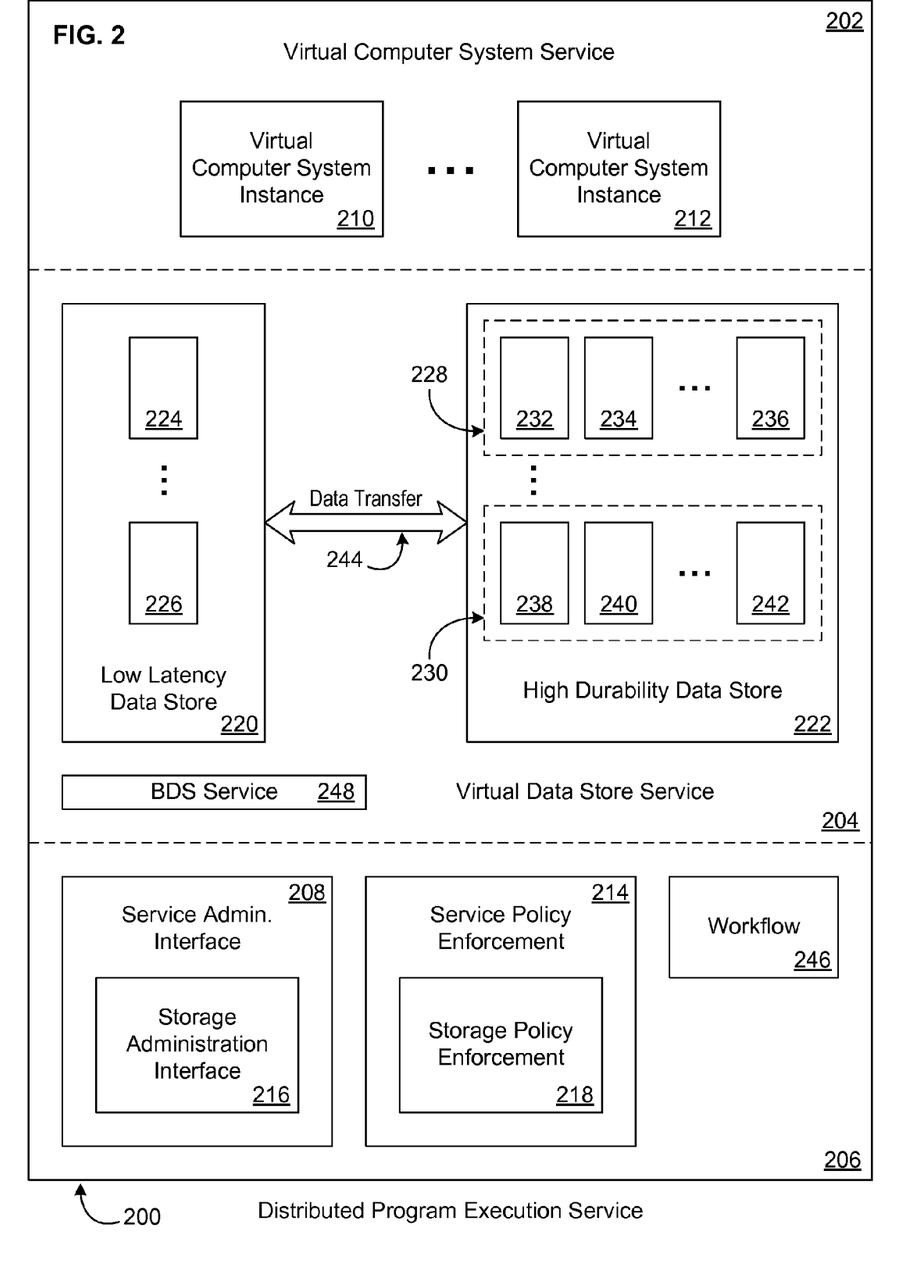
FIG. 2 is a schematic diagram depicting aspects of an example program execution service in accordance with an embodiment.

In at least one embodiment, one or more aspects of the environment 100 may incorporate and/or be incorporated into a distributed program execution service. FIG. 2 depicts aspects of an example distributed program execution service 200 in accordance with at least one embodiment. The distributed program execution service 200 provides virtualized computing services, including a virtual computer system service 202 and a virtual data store service 204, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the Web server 106 and the application server 108 described above with reference to FIG. 1, one or more data stores such as the data store 110 of FIG. 1, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one embodiment, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data store such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at a particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual file system volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual file system volumes.

Data stores in the virtual data store service 204, including the low latency data store 220 and/or the high durability data store 222, may be facilitated by and/or implemented with a block data storage (BDS) service 248, at least in part. The BDS service 248 may facilitate the creation, reading, updating and/or deletion of one or more block data storage volumes, such as file system volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each has multiple physical server storage systems co-located at a geographical location, such as in each of the one or more geographically distributed data centers, and the program(s) that uses a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and annually. Different portions of the data set 224, 266 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 232 of the data set 224 may involve a substantially full copy of the data set 224 and transfer 244 through the network to the high durability data store 222 (may be a "full capture"). The data set 224 may be associated with various kinds of metadata. Some, none or all of such metadata may be included in a capture 232, 234, 236 of the data set 224 depending on the type of the data set 224. For example, the low latency data store 220 may specify metadata to be included in a capture depending on its cost of reconstruction in a failure recovery scenario. Captures 234, 236 beyond the initial capture 232 may be "incremental", for example, involving a copy of changes to the data set 224 since one or more previous captures. Captures 232, 234, 236 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 234, 236, utilization load on the underlying computing resources can be significantly less for incremental captures compared to full captures.

For example, a capture 232, 234, 236 of the data set 224 may include read access of a set of servers and/or storage devices implementing the low latency data store 220, as well as write access to update metadata, for example, to update a data structure tracking "dirty" data blocks of the data set 224. For the purposes of this description, data blocks of the data set 224 are dirty (with respect to a particular class and/or type of capture) if they have been changed since the most recent capture (of the same class and/or type). Prior to being transferred 244 from the low latency data store 220 to the high durability data store 222, capture 232, 234, 236 data may be compressed and/or encrypted by the set of servers. At the high durability data store 222, received capture 232, 234, 236 data may again be written to an underlying set of servers and/or storage devices. Thus each capture 232, 234, 236 involves a load on finite underlying computing resources including server load and network load.

Captures 232, 234, 236 of the data set 224 may be manually requested, for example, utilizing the storage administration interface 216. In at least one embodiment, the captures 232, 234, 236 may be automatically scheduled in accordance with a data set capture policy. Data set capture policies in accordance with at least one embodiment may be specified with the storage administration interface 216, as well as associated with one or more particular data sets 224, 226. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Flexible data set capture policies may specify that a capture is to occur within a particular time window (e.g., 2 am-6 am everyday, sometime on Sunday, after close of business on the last day of the month) or with a particular frequency (e.g., once per hour, twice per day, once per week, once per month). In at least one embodiment, flexible data set capture policies may specify that captures be scheduled to meet suitable goals, targets and/or conditions (collectively, "capture conditions").

For example, each capture 232, 234, 236 may have an associated cost, financially and/or in terms of computational resources, and the flexible data set capture policy may specify a cost target and/or cost cap for the capture 232, 234, 236 or set of captures 228 including a budget per time period and/or an average cost per capture. As another example, in at least one embodiment, a probability of data loss of a portion of a data set 224 is a function at least of an amount of uncaptured data in the data set 224 at a given time. Accordingly, a flexible data set capture policy may specify a target probability of data loss of a portion of the data set 224, and the storage policy enforcement component 218 may schedule captures of the data set 224 to meet the target by keeping the amount of uncaptured data in the data set 224 below an associated uncaptured data target and/or cap.

Data set capture policies may specify any suitable combination of fixed schedules, flexible schedules, and capture conditions. Data set capture policies may further specify capture lifetimes and/or capture retention goals, targets and/or conditions. For example, a seven day lifetime may be specified for daily captures, a four week lifetime may be specified for weekly captures, and/or an annual lifetime may be specified for monthly captures. Captures may have an unspecified and/or unlimited lifetime, thus requiring manual deletion. Furthermore, particular captures may be protected, for example, may require manual deletion by a designated set of authenticated users. Captures 232, 234, 236 and/or capture sets 228, 230 may be associated with costs (e.g., a periodic fee for storage per gigabyte), and the data set capture policy may specify that captures 232, 234, 236 be automatically deleted to meet a cost target and/or cap. Enforcement of data capture retention policies may analyze associated capture sets 228, 230 to prioritize deletion of redundant captures and/or prohibit deletion of a capture that would prevent restoration of the data set 224 to its state in time corresponding to the most recent capture 232.

Figure 3:
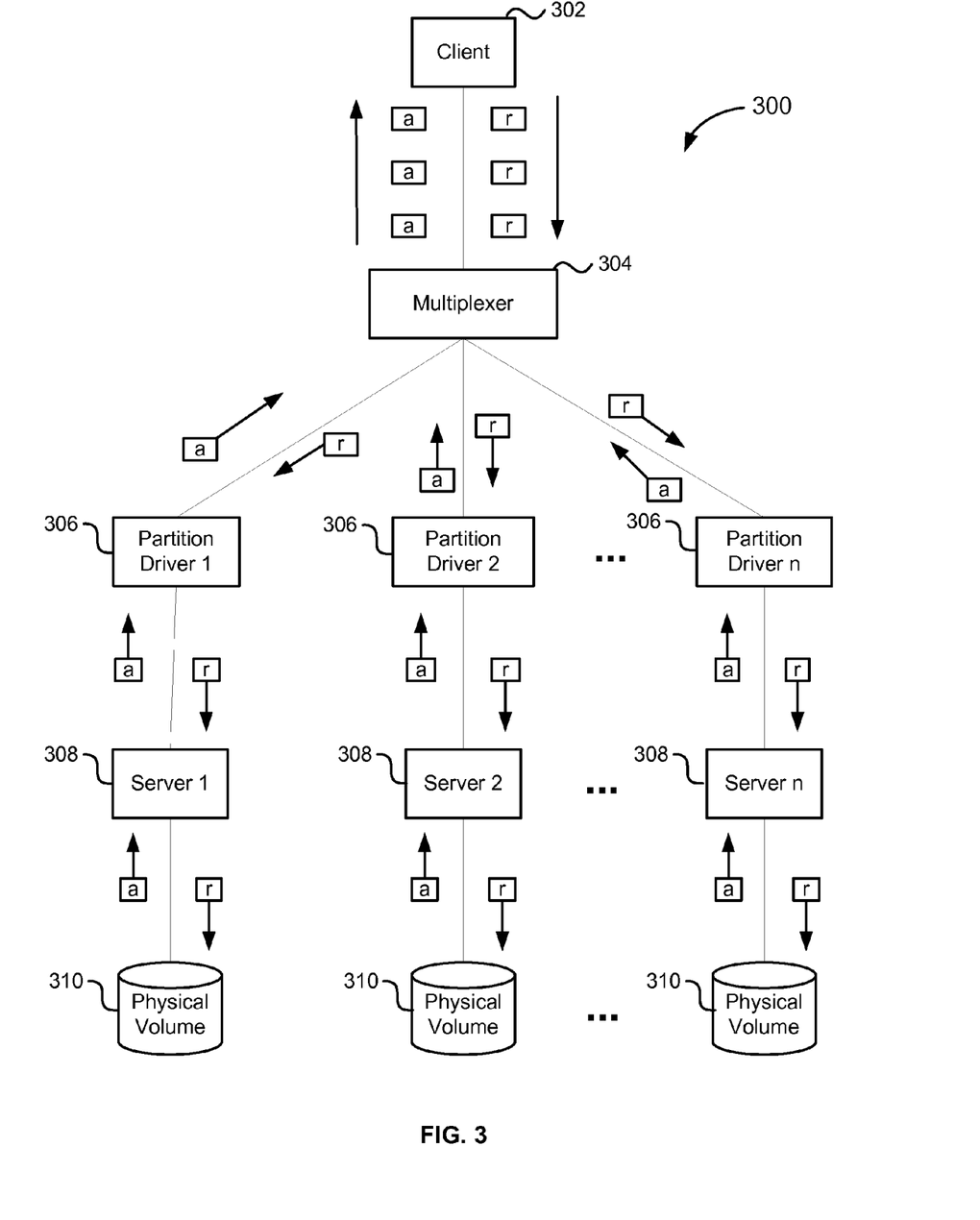
FIG. 3 is a diagrammatic representation of an illustrative example of a configuration of a system that may be used to implement embodiments of the present disclosure.

FIG. 3 shows a schematic diagram 300 of an environment in which captures may be recorded, in accordance with an embodiment. In this example, a client 302 operates in accordance with a set of executable instructions. The client may be a computing device, such as a computing device described above, or a module operating on a computing device. In an embodiment, the client 302 utilizes, creates, and otherwise uses data in its operations. In an embodiment, as the client 302 operates, the client generates a plurality of requests for performing data operations, such as creation operations, reading operations, updating operations, and deletion operations in connection with data stored in a logical volume, where a logical volume is a representation of a data set that is physically stored in one or more physical storage devices. In this example, as discussed more below, the local volume used by the client device 302 is served by a plurality of physical volumes. The physical storage devices may be block storage devices or other storage devices. Also, when the data set is stored in multiple physical storage devices, the physical storage devices may be distributed among a plurality of locations, such as locations in a common data center and/or different geographic locations. Thus, from the point of view of the client 302, requests to perform data operations are made with respect to a logical volume regardless or how many physical volumes are used to store the data set. The client 302 may or may not be able to identify and/or specify information identifying the physical storage devices themselves.

As the client 302 makes various requests to perform data operations, the client sends a plurality of requests to a multiplexer 304, where a multiplexer is a computing device or module operable to distribute requests from the client 302 appropriately so that the requests may be fulfilled, as described below. In this example, the requests are represented by boxes containing the letter "r". The requests may be web service requests made to the multiplexer 304 or intermediate system between the multiplexer 304 and the client 302, although, generally, the requests may be made in any suitable manner according to any suitable protocol.

In an embodiment, when the multiplexer 304 receives a request from the client 302, the multiplexer 304 distributes the request to an appropriate partition driver 306, where a partition driver may be a module operable to communicate the request to a server 308 that has access to a physical data store 310. The multiplexer 304 and partition drivers 306 may be executed as part of a common device such that communications between the multiplexer 304 and partition drivers 306 are performed in memory and, therefore, relatively quickly. However the multiplexer 304 and one or more partition drivers 306 may be distributed on a network. In addition, while, for the purpose of illustration, requests at each level in the diagram 300 are shown identically, requests may be translated into different formats to accommodate different components receiving the requests. For example, a request from the client 302 to the multiplexer 304 may be in one format while information corresponding to that request from the multiplexer 304 to a partition driver 306 may be in another format.

In an embodiment, when data operations requested by the client 302 are performed, the acknowledgments of completion of the operation are sent from a physical volume 310 where the operation was performed to the client 302, as shown in the diagram 300 by a box containing the letter "a". As with the requests, acknowledgements may be in different formats when being communicated from one component to another. Also, while, for the purpose of illustration, the diagram 300 shows each server 308 communicating with a single physical volume 310, a server may communicate with multiple physical volumes and portions of a data set accessed by the client 302 and may be stored in one or more physical volumes in communication with a server.

As discussed, captures of data sets may be taken for various reasons. In many instances, captures may be taken in accordance with one or more guarantees concerning the accuracy of which capture represents a data set at a period in time. Guarantees may relate to requests to perform data operations near the time the process of capturing a data set was initiated. For example, captures may be taken in a manner that guarantees that a capture will include all writes which were acknowledged before a capture was initiated, such as before a request to take a capture was sent and/or received, and that the capture will not include any writes which were submitted after the capture was initiated (i.e. after we return success). Such guarantees may leave indeterminacy about the writes which were submitted before or during initiation and were acknowledged during or after initiation. There are several options for handling such writes, including providing some form of strong consistency guarantee, a weaker guarantee, or no guarantee at all.

With a strong consistency guarantee, for some time t (which may be between the time the customer sends the request and the time the customer receives the response), a capture may be guaranteed to include all writes which were submitted before t (including some which were acknowledged after t) or no writes which were submitted before t (including some which were acknowledged before t). In instances where a logical volume is served by multiple servers, a strong consistency guarantee generally requires any clients of the logical volume to be acquiesced and flushed, resulting in a potentially significant performance penalty. Moreover, a strong consistency guarantee may be insufficient to satisfy some customer use cases, which require an even stronger guarantee where the capture is guaranteed to include all writes that were both submitted and acknowledged before t. Such an additional guarantee may require compliance of the customer application. For example, the application may choose a checkpoint, stop writing, wait for all writes to be acknowledged, and then resume writes. In general, all of these approaches require imposing constraints which the customers may not need and potentially at the cost of high latency to resolve writes.

Figure 4:
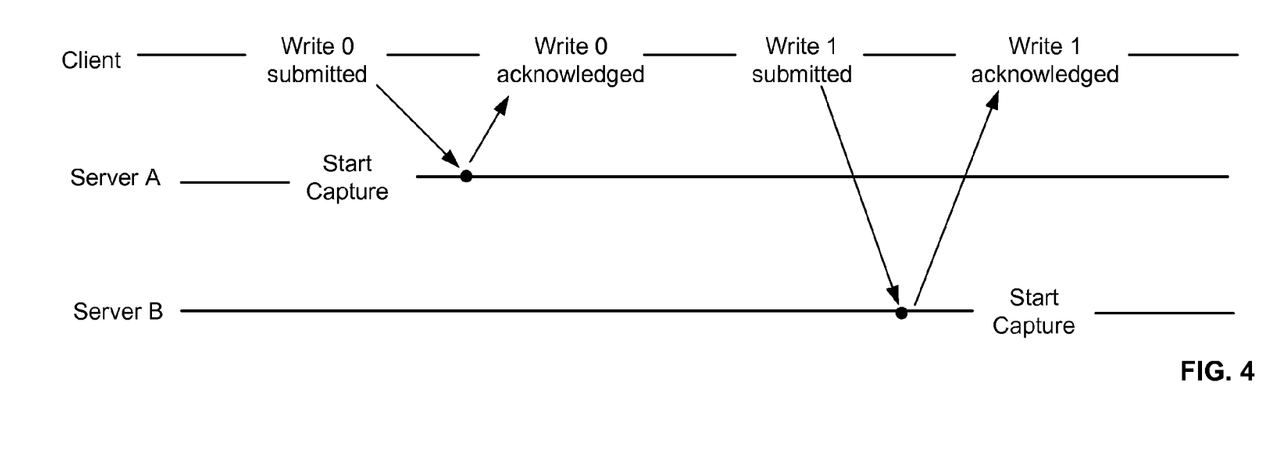
FIG. 4 is a representation of a timeline illustrating write operations and capture of a distributed data set.

However, even though it improves latency, not providing additional capture consistency guarantees may lead to undesirable results, as illustrated by FIG. 4. FIG. 4 shows an illustrative example of a timeline that includes write and capture-related events. In particular, FIG. 4 shows a situation in which a logical volume is served by two servers, referred to as Server A and Server B in the figure. In the example shown in FIG. 4, captures of partitions corresponding to each server are initiated at approximately the same time without other coordination of the capture among the servers. In this timeline, (in which time progresses from left to right), the client issues two writes, Write 0 and Write 1, one after the other. Also in this example, the client waits for the acknowledgment of Write 0 before submitting Write 1, resulting in three possible consistent situations: the capture containing neither Write 0 nor Write 1, the capture containing Write 0, or the capture containing both Write 0 or Write 1. However, in the situation illustrated in FIG. 4, it is possible to take an inconsistent capture in which only Write 1 is present, since the capture with respect to Server A was initiated before acknowledgment of Write 0. If an application executing on the client depends on the order of Write 0 and Write 1, then if the logical volume (or a portion thereof) was restored from the capture, the data in the logical volume may be nonsensical (corrupt), perhaps causing malfunction of the client and any applications depending from the data in the logical volume.

To avoid such consequences, a guarantee about the consistency of the capture may be given that is weaker than the strong consistency described above, but which nonetheless provides a strict ordering guarantee where, for some time t (during capture initialization): the capture will include all writes which were acknowledged before t; and the capture will include no writes which were submitted after t. In other words, for all writes Write 0 and Write 1, if Write 1 was submitted after Write 0 was acknowledged, then, if Write 1 is in the capture, then Write 0 must also be in the capture. This is simply a tighter version of the original set guarantees, which is sufficient to provide the guarantee that a causal link between two writes may not be broken. In an embodiment, this is implemented by deferring the acknowledgment of write requests until after initialization of a capture; that is, when the capture of a partition is initiated, that partition stops acknowledging write requests until it is instructed to resume acknowledgments. During that time, a server may continue to process incoming write requests, but the server defers (blocks) acknowledgment of those requests until an appropriate time, such as when a capture that has been initiated with respect another server (or all other servers) has been acknowledged. If every server blocks until the last one has started blocking, then the above guarantee can be met.

Figure 5:
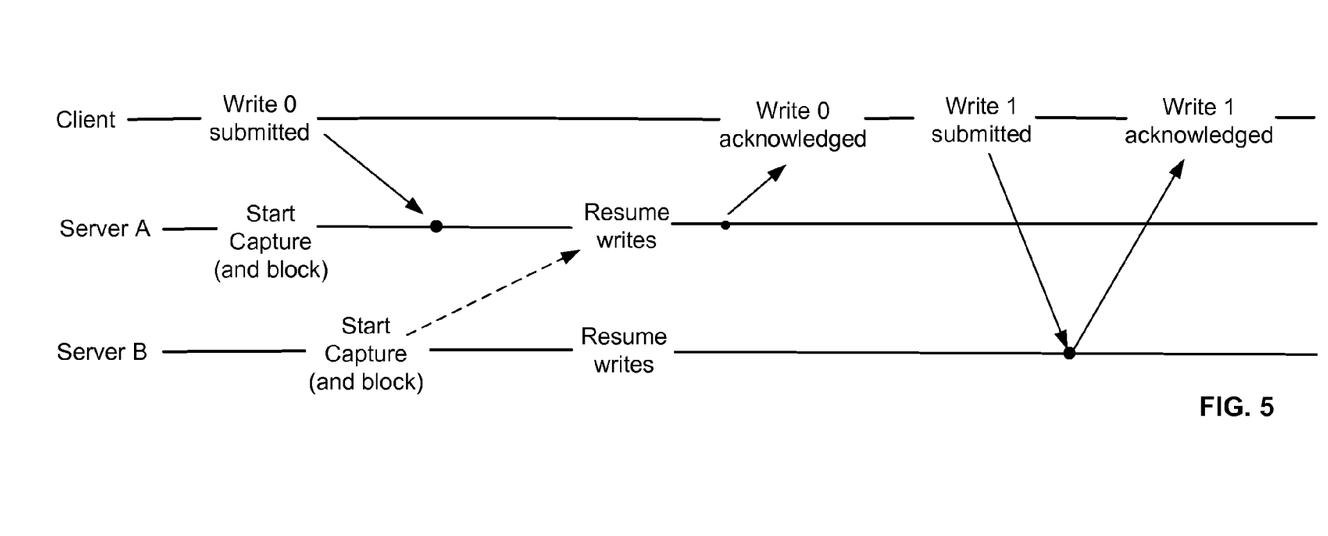
FIG. 5 is a representation of another timeline illustrating write operations and capture of a distributed data set.

FIG. 5 shows a timeline similar to the timeline illustrated in FIG. 4. In this example, an algorithm for maintaining the weaker condition described above is implemented. In this scenario, the client blocks, waiting for the acknowledgment of Write 0. Meanwhile, the Server A and Server B proceed with starting the capture on their respective partitions of the logical volume. Once all of the captures have been initiated, the client resumes waiting for acknowledgement of Write 0 and the servers release write acknowledgments. As shown, Server A acknowledges Write 0 to the client, and the client then proceeds to issue write 1, which is then acknowledged by Server B. It should be noted that there is a difference from the strong guarantee in that the client does not need to wait for acknowledgments to all pending requests before the capture may proceed, thereby causing the resulting latency to be significantly less.

Figure 6:
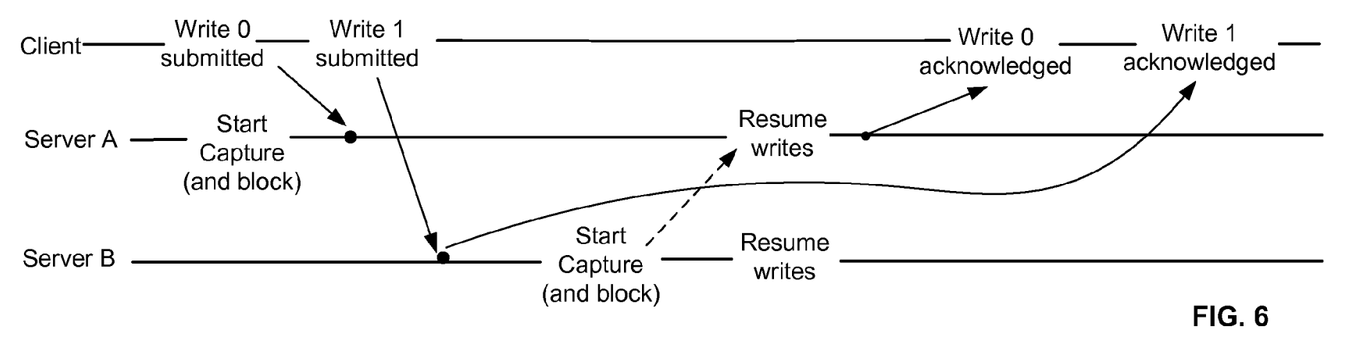
FIG. 6 is a representation of yet another timeline illustrating write operations and capture of a distributed data set.

Nevertheless, this weaker guarantee results in some behavior which may be considered unusual. For example, FIG. 6 illustrates a situation where out-of-order packet delivery causes Write 1, which is acknowledged after write 0, to be included in a capture which does not include write 0. In this case, Write 1 is in the capture, but Write 0 is not. It should be noted that this does not violate the weaker consistency guarantee described above, as Write 1 was submitted before write 0 was acknowledged, and therefore the two writes do not have any causal link. In fact, in this instance, the order in which the two writes were submitted does not matter; this situation also arises with modern input/output (I/O) schedulers which are free to reorder writes as appropriate. Such a principle may take the following negative form: for any two writes, Write 0 and Write 1, if Write 1 was submitted after Write 0 was acknowledged and if Write 1 is in the capture, then Write 0 must also be in the capture.

One way of guaranteeing that this set of conditions is satisfied is to perform a two-phase commit on servers (server-side two-phase commit) serving physical storage devices on which partitions of a logical volume are stored. With a server-side two-phase commit, upon receiving a request to perform a capture, each server is instructed to stop accepting new writes.

After all of the servers have stopped, the servers are instructed to take a capture and then start accepting new writes once again. This ensures that all writes confirmed (acknowledged) before the last write that made it into the capture will also be in the capture, thereby avoiding logical inconsistencies in the capture by including writes that depend from other writes but not including the writes from which those writes depend.

Performance of a server-side two-phase commit, while useful for the above reasons, can create operational problems. If, for example, there is difficulty in one server processing a start phase of the commit (for example, the server is unable to acknowledge that the server has stopped accepting new writes), the capture process cannot continue until the difficulty is overcome. In other words, one or more servers may be idle while a response by one or more other servers is awaited. Thus, a problem with one server may cause a delay in many servers. Moreover, as the number of physical storage devices into which a volume is partitioned increases, the chances that the snapshot will take a longer time to initiate are increased. Such delay by servers may cause poor application performance and/or malfunction.

Figure 7:
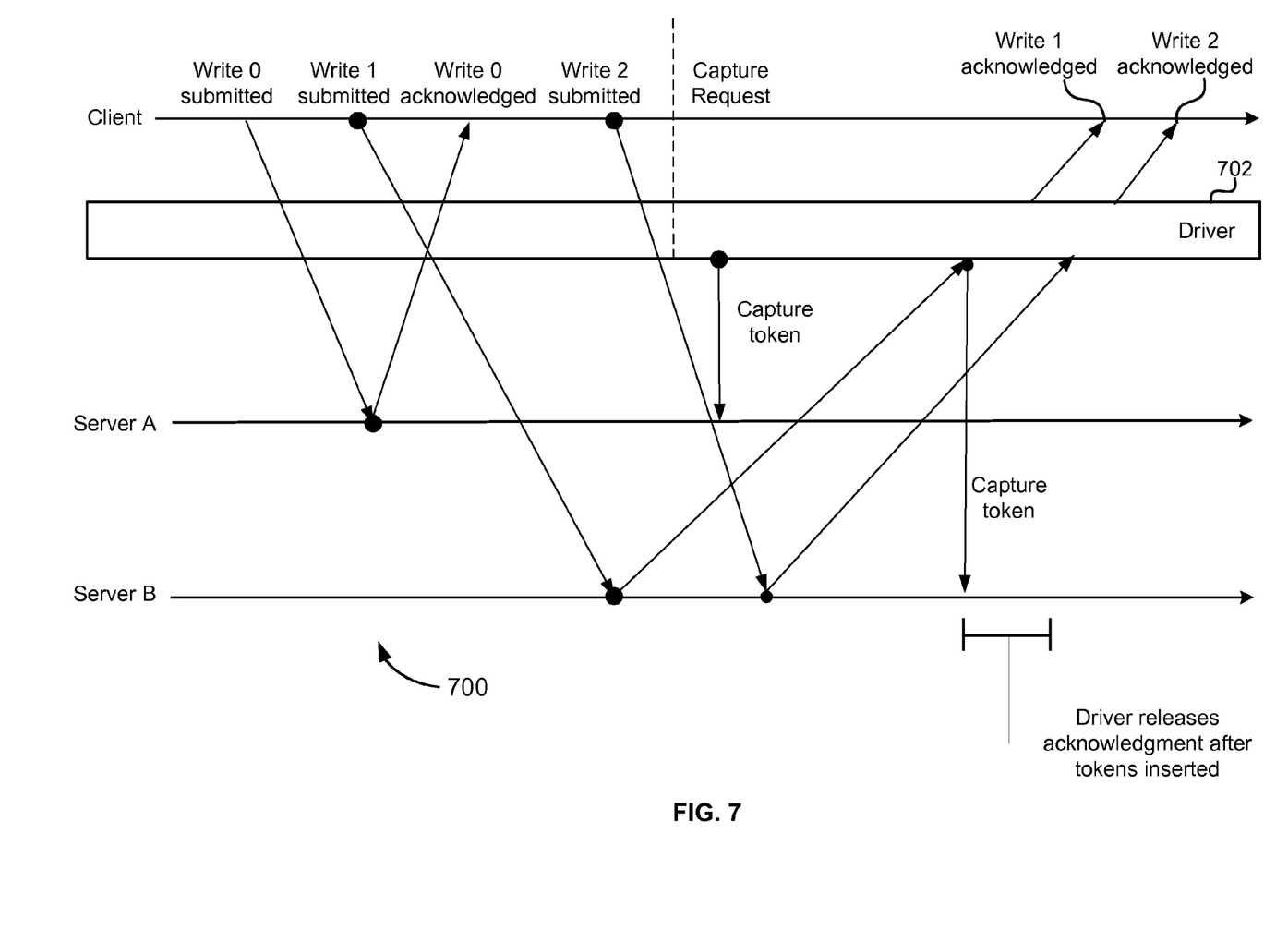
FIG. 7 is a representation of yet another timeline illustrating write operations and capture of a distributed data set.

FIG. 7 illustrates an illustrative example in accordance with an embodiment of a process being implemented that ensures that the above-stated weaker condition can be guaranteed. In this example diagram 700, a client-side two-phase commit is performed. In particular, as shown in the drawing, a client communicates requests for performing data operations to two servers, identified in the drawing as Server A and Server B. The client, for example, may be requesting performance of operations on data stored in a virtual volume that is distributed among two physical volumes served by Server A and Server B. Client requests may be made pursuant to an application executing on the client or in another computing device in communication with the client. In the example provided in the drawing, the client communicates to the servers through a driver layer 702. The driver layer 702 may be one or more computing devices or may be implemented on one or more computing devices. The driver layer may comprise a plurality of drivers or, generally, other storage interfaces, such as the drivers discussed above in connection with FIG. 3. While not shown, a multiplexer may receive requests from the client and forward the requests to an appropriate driver of the driver layer. In this example, the driver layer may have two drivers, one for each of Server A and Server B.

In the illustrated embodiment shown in FIG. 7, when the client sends a request, the request is received by the driver layer 702 and forwarded to an appropriate server. For example, if the client requests that an operation be performed on one or more blocks of data, the driver layer, in an embodiment, determines the server(s) having access to the applicable blocks of data and sends the request to each applicable server. As an example, as shown in FIG. 7, the client sends a write request illustrated as Write 0, which is received by the driver layer 702. The driver layer 702 determines that Write 0 applies to a block of data stored on a physical storage device served by Server A and accordingly forwards the request to Server A which then performs the requested operation and sends an acknowledgment that the operation was performed to the driver layer 702, which forwards the acknowledgment to the client.

As shown in the example, the client submits another write request, Write 1, to the driver layer 702, which determines that Write 1 applies to data accessible by Server B and, therefore, forwards the request to Server B. When the requested operation is performed, Server B sends acknowledgment of the operation's performance to the driver layer 702, which forwards the acknowledgment to the client. In this example, Write 2 was sent by the client before the client received acknowledgement that Write 1 was performed, thereby indicating that Write 2 does not depend on Write 1. Therefore, according to the weaker guarantee discussed above, if Write 2 is in a capture, Write 1 does not necessarily need to be in the capture, although it may. As noted, requests from the client may specify operations on data that is stored in multiple physical storage devices. As an example, a request may specify operations for several blocks of data, some blocks stored in a physical storage device served by Server A and others stored in a physical storage device served by Server B. In such an embodiment, the driver layer 702 may send a request applicable to the physical storage device served by Server A to Server A and another request applicable to the physical storage device served by Server B to Server B. In other words, the driver layer 702 may split the client's request into multiple requests and send each of the multiple requests to an appropriate server.

Also shown in FIG. 7, the client submits yet another request to perform an operation, identified in the drawing as Write 2. The driver layer 702 receives the request, determines that Write 2 applies to data stored in a physical storage device served by Server B, and forwards Write 2 to Server B. In the example, however, a request to take a capture of the logical volume distributed among physical storage devices served by Server A and Server B is sent and received before the driver layer receives acknowledgment that Write 2 was received. The capture request may be sent by the client or by another device, such as a device that sends capture requests according to a schedule, a user-submitted request for a capture, or in any other manner. In an embodiment, when the driver layer 702 receives the capture request, the driver layer 702 stops processing acknowledgments and/or requests. The driver layer 702 then inserts a capture token into a request stream from the driver layer 702 to each server. For example, referring to FIG. 3, each driver may insert a capture token into a request stream from the driver to a corresponding server. Acknowledgments and/or requests received by the driver layer 702 may be held in memory until the tokens have been inserted into the request streams. Further, instructing one or more drivers of the driver layer 702 to stop processing requests may be an in-memory operation and, therefore, relatively quick.

A capture token, in an embodiment, is any information that, when received by a server, indicates to the server that the server should perform a capture of a portion of a logical volume stored in a corresponding physical storage device before processing additional requests originating from the client. The token may be an explicit instruction to the server or may be other information. As an example, requests in the request stream from the driver layer to a server may include a number or other identifier that changes each time a capture of the logical volume is taken. A server may detect a change of the identifier and, in response, capture a portion of the logical volume before processing additional requests originating from the client, generally, any information that indicates to the server to take a capture. Additionally, the information inserted into the request stream may vary, such as, depending on which guarantees for a particular capture are being ensured.

As shown in the drawing, the capture request is received by the driver layer 702 after having forwarded requests to perform Write 1 and Write 2 to the server and before receiving acknowledgments from Server B that Write 1 and Write 2 were performed. In addition, as illustrated, the driver layer receives acknowledgment of Write 1 and Write 2 after inserting a capture token in the request stream from the driver layer 702 to Server A, but before inserting a capture token into the request stream from the driver layer 702 to Server B. In order to comply with the set of conditions discussed above, the driver layer 702 delays forwarding acknowledgment of Write 1 and Write 2 to the client 702. The driver layer 702 may hold the acknowledgments of Write 1 and Write 2 in memory until capture tokens have been inserted into all appropriate request streams and then forwarding the acknowledgements to the client. Other operations may be delayed by the driver layer 702, such as forwarding of requests to appropriate servers. In this manner, unlike with a server-side two-phase commit, Server A and Server B are able to process requests when able, rather than having to wait for other servers. Moreover, because instructing the driver layer 702 to stop processing requests until inserting a capture token into request streams to the servers may be an in-memory request that is quicker than instructing servers to stop processing requests, one or more servers are able to again begin processing requests and/or acknowledgments sooner than with a server-side two-phase commit.

It should be noted that FIG. 7 provides an illustrative example of a specific occurrence of a client-side two phase commit and that various variations are contemplated as being within the scope of the present disclosure. For example, FIG. 7 illustrates a logical volume partitioned among two physical volumes, each being served by a corresponding server. However, a logical volume may be partitioned among more than two physical volumes and the driver lawyer may, accordingly communicate with more than two servers for the purpose of performing data operations. Further, FIG. 7 illustrates a particular configuration where a client device communicates with servers through a driver layer. However, as noted, the principles described herein are applicable to variations of this configuration and other configurations including, generally, any configuration where a client communicates with a server, directly or indirectly, in order to perform operations on data in a data set that is stored in a distributed manner.

Figure 8:
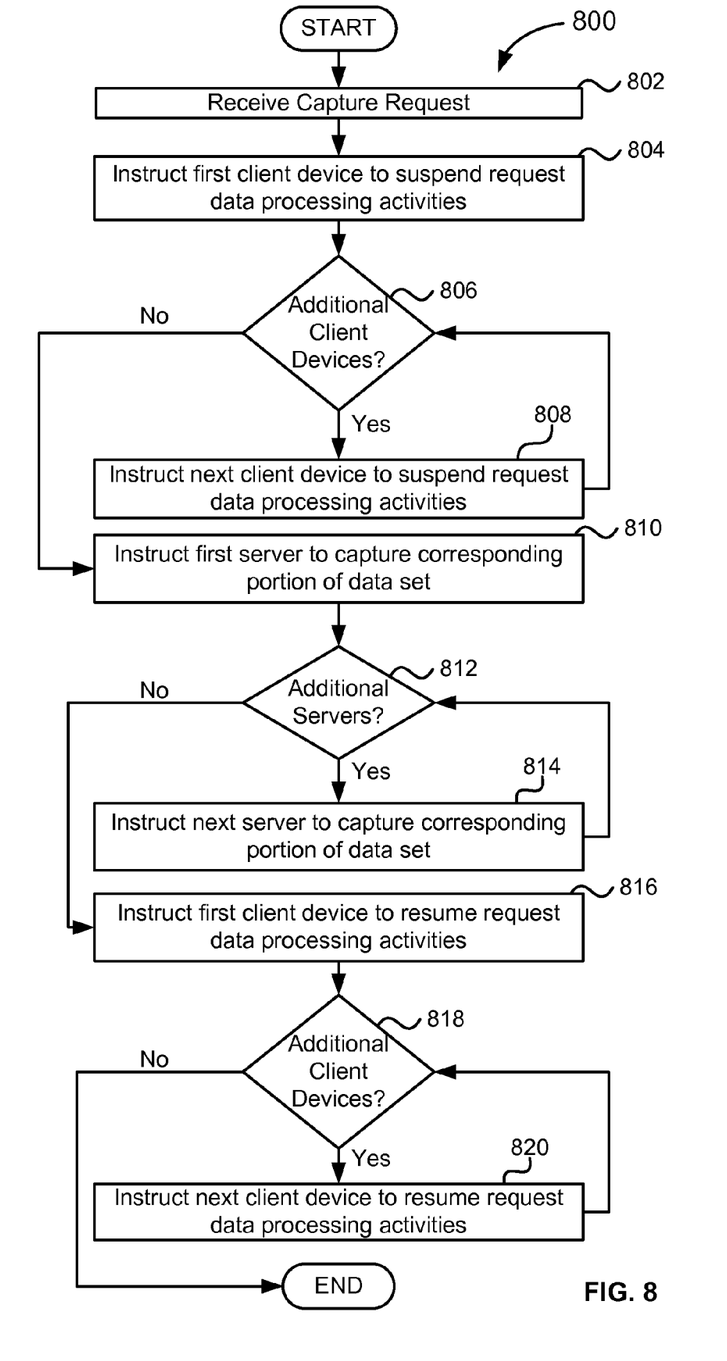
FIG. 8 is a flowchart for an illustrative example of a process that may be used to implement various embodiments of the present disclosure.

FIG. 8 shows a flowchart for an illustrative example of a process 800 for recording information. The process 800 may, for example, be used to implement the principles illustrated above in FIG. 7. Portions of the process 800 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

In an embodiment, a capture request is received 802. A capture request, as discussed above, is any information that indicates to a recipient that a data set should be captured. The capture request may be, for example, an executable instruction for capturing the data set. The capture request may also be information that is used by the recipient to apply processing logic in order to determine whether the data set should be captured. The capture request may be received from any suitable source, such as a computing device on which an application that uses the data set is executing or another computing device, such as a computing device that schedules captures of data sets. The capture request may also be generated internally in a computing device performing at least a portion of the process 800, or variations thereof. For instance, a computing device that manages storage devices that store at least the data set may determine based on a schedule or other factors that a capture should be taken and may operate accordingly. In other words, the capture request may originate dependent from or independently of an application that uses the information stored in the data set.

When the capture request is received, in an embodiment, a first client device is instructed to suspend one or more data processing activities. The instruction to suspend one or more data processing activities may be or include an instruction to suspend acknowledgments of data set operations that were performed and/or instructions to forward requests from an application to one or more servers. Referring to FIG. 3 as an illustrative example, the client device may be a driver or computing device on which multiple drivers are executing. The client device may also be the client 302 depicted in the drawing or another device. Generally, the client device that is instructed to suspend one or more data processing activities may be any device that communicates with a server that operates in connection with a data store. When the first client device has been instructed to suspend one or more data processing activities, a determination may then be made 806 whether there are additional client devices that need the instruction and, if there are, then the next client device is instructed 808 to suspend one or more data processing activities in the data set and once again a determination is made 806 whether there are additional client devices that need to be instructed to suspend processing of requests.

When all of the client devices have been instructed to suspend one or more data processing activities, and a determination that there are no additional client devices that should be instructed to suspend one or more data processing activities, accordingly, in an embodiment, a set of servers serving partitions of the data set is instructed to capture corresponding portions of the data set. Instructing the servers to capture corresponding portions of the data set may include instructing 810 a first server to capture a corresponding portion of a data set and making a determination 812 whether there are additional servers that should be instructed to capture the data set. In an embodiment, instructing the first server is performed responsive to receipt of an acknowledgment from the client devices that the client devices have suspended processing of one or more data processing activities. If there are additional servers that should be instructed to capture the data set, the next server may be instructed 814 to capture a corresponding portion of the data set, and the determination of whether there are additional servers that should be instructed to capture a corresponding portion of the data set may be made 812 again.

When all servers have been instructed to capture corresponding portions of the data set, a determination may be made 812 that there are no additional servers that should be instructed to capture a corresponding portion of the data set, and the client devices may be instructed to resume processing of the one or more data processing activities. Instructing the client devices to resume processing the one or more data processing activities may include instructing 816 a first client device to resume the one or more data processing activities, determining 818 whether additional client devices should be instructed to resume processing of the one or more data processing activities and, if there are additional client devices that should be instructed to resume processing of the one or more data processing activities, instructing 820 client device to resume processing of the one or more data processing activities until all client devices have been instructed.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for capturing a representation of a data set, the data set being distributed among a plurality of physical storage devices each accessible by at least one corresponding server operable to receive instructions from one or more storage interfaces to cause corresponding operations for data in the data set to be performed, the method comprising:

under the control of one or more computer systems configured with executable instructions,
receiving an instruction from a client device to capture the representation of the data set at a point in time, the point in time based at least in part on a capture policy specified by the client device; and
responsive to at least the instruction to capture the representation of the data set:
issuing, to the one or more storage interfaces, a first command to suspend at least acknowledgment of completion of write operations to an application of the client device;
for each of the one or more storage interfaces, receiving a first notification that the storage interface has suspended processing of at least acknowledgment of completion of the write operations;
at a time after receiving the first notification for each of the one or more storage interfaces, instructing each of the servers to enqueue an instruction to capture a representation of a portion of the data set stored in a corresponding physical storage device and subsequently resume acknowledging completion of the write operations, the captured representation of the portion of the data set associated with the point in time; and
storing the captured representation of the portion of the data set.

2. The computer-implemented method of claim 1, further comprising:
receiving requests to perform the write operations, the request received from the application; and
for each of the requests, selecting a physical storage device in which to perform a corresponding operation and performing the corresponding operation in the selected physical storage device.

3. The computer-implemented method of claim 1, wherein the application executes on the client device, and wherein the client device includes a computer system different from the one or more storage interfaces, the servers, and the physical storage devices.

4. The computer-implemented method of claim 1, wherein instructing each of the servers to enqueue an instruction to capture a portion of the data set stored in a corresponding physical storage device and subsequently resume acknowledging completion of the write operations includes, for each server of the servers, inserting a token into a request stream from the one or more storage interfaces to the server.

5. The computer-implemented method of claim 1, wherein communicating the requests to perform the data operations includes:
receiving the requests from the application of the client device; and
for each request of the requests, selecting at least one storage interface of the one or more storage interfaces, wherein each of the one or more storage interfaces are configured to instruct a corresponding server to cause, in a corresponding physical storage device, completion of an operation corresponding to the request.

6. The computer-implemented method of claim 1, wherein at least one of the one or more storage interfaces is configured to cause completion of one or more data operations while suspending at least acknowledgement of performance of the one or more data operations.

7. A computer-implemented method for capturing a representation of a data set, comprising:
under the control of one or more computer systems configured with executable instructions, receiving an instruction from a client device to capture the representation of the data set at a point in time, the point in time based at least in part on a capture policy received from the client device; and responsive to at least the instruction to capture the representation of the data set:

instructing one or more applications to suspend at least acknowledgment of completion of data operations, the data operations including manipulation of the data set that is distributed among a plurality of partitions, each of the partitions being operated in accordance with operation of a corresponding server of a plurality of servers, the one or more applications being in communication with the servers for at least writing to the data set;

responsive to suspension by the applications of acknowledgment of completion of the data operations, instructing the servers to capture corresponding portions of the data set stored in corresponding partitions of the data set; and at a time after instructing the servers to capture the corresponding portions of the data set, instructing the one or more applications to resume at least acknowledgment of completion of the data operations.

8. The computer-implemented method of claim 7, wherein requests to perform the data operations originate on a computing device different from the one or more applications.

9. The computer-implemented method of claim 7, wherein the plurality of partitions are stored on a plurality of physical storage devices.

10. The computer-implemented method of claim 7, wherein instructing the servers to capture corresponding portions of the data set includes inserting a token into request streams to the servers.

11. The computer-implemented method of claim 7, further comprising generating, independently of operation of a user application from which requests to perform the data operations originate, an instruction to capture the data set and wherein instructing one or more clients of a plurality of servers to suspend at least acknowledgment to the user application of completion of data operations performed responsive to the instruction to capture the data set.

12. The computer-implemented method of claim 7, wherein at least one of the one or more storage interfaces is configured to cause completion of one or more data operations while suspending acknowledgment of at least acknowledgement of performance of data operations.

13. The computer-implemented method of claim 7, wherein instructing one or more applications to suspend at least acknowledgment of completion of data operations includes instructing the one or more applications to suspend issuing acknowledgments of completions of write operations.

14. The computer-implemented method of claim 7, wherein instructing one or more applications to suspend at least acknowledgment of completion of data operations includes instructing the one or more applications to postpone issuance of write requests.

15. A system operable to direct capture of a representation of a data set, comprising:

one or more processors; and memory including executable instructions that, when executed by the one or more processors, cause the system to:

receive an instruction from a client device to capture the representation of the data set at a point in time, the point in time based at least in part on a capture policy received from the client device; and responsive to at least the instruction to capture the representation of the data set:

instruct one or more applications to suspend at least acknowledgment of completion of data operations, the data operations including manipulation of the data set that is distributed among a plurality of partitions, each of the partitions being operated in accordance with operation of a corresponding server of a plurality of servers, the one or more applications being in communication with the servers for at least writing to the data set;

responsive to suspension by the applications of completion of the data operations, instruct the servers to capture corresponding portions of the data set stored in corresponding partitions of the data set; and at a time after instructing the servers to capture the corresponding portions of the data set, instruct the one or more applications to resume at least acknowledgment of completion of the data operations.

16. The system of claim 15, wherein the plurality of partitions are stored on a plurality of physical storage devices.

17. The system of claim 15, wherein instructing the servers to capture corresponding portions of the data set includes inserting a token into request streams to the servers.

18. The system of claim 15, wherein requests to perform the data operations originate from a user application executing on a computing device different from the one or more applications.

19. The system of claim 18, wherein the memory includes executable instructions that, when executed by the one or more processors, cause the system to generate, independently of operation of the user application, an instruction to capture the data set and wherein instructing one or more clients of a plurality of servers to suspend at least acknowledgment to the user application of completion of data operations performed responsive to the instruction to capture the data set.

20. One or more non-transitory computer-readable storage media having collectively stored thereon instructions that, when executed by one or more processors, cause the one or more processors to:

receive an instruction from a client device to capture a representation of a data set at a point in time, the point in time based at least in part on a capture policy received from the client device; and responsive to at least the instruction to capture the representation of the data set:

instruct one or more storage interfaces to suspend processing of one or more activities in connection with the data set;

at a time after the one or more storage interfaces suspend processing of the one or more activities, insert a token into a plurality of request streams, each of the plurality of request streams from the one or more storage interfaces to a server of a plurality of servers, each of the plurality of servers being operable to cause completion of a data operation in a data set partition according to requests in a corresponding request stream, each token being an indication for performing a capture of a data set partition of the plurality of data set partitions; and at a time after inserting the token into the one or more request streams, instruct the one or more storage interfaces to resume processing of the one or more activities.

21. The one or more non-transitory computer-readable storage media of claim 20, wherein the data set partitions are distributed among a plurality of physical storage devices.

22. The one or more non-transitory computer-readable storage media of claim 20, wherein each request stream comprises a collection of requests for performing data operations from a corresponding computing device of the one or more storage interfaces to a corresponding server of the plurality of servers.

23. The one or more non-transitory computer-readable storage media of claim 20, wherein, for each server, the request stream comprises a plurality of requests for performing a data operation from the one or more storage interfaces.

24. The one or more non-transitory computer-readable storage media of claim 20, further comprising instructions that, when executed by one or more processors, cause the one or more processors to:
    receive requests for performing data operations from the application; and
    for each of the requests from the application:
        select an appropriate server for performing a requested operation; and
        instruct the selected server to cause completion of the requested operation.

25. A computer-implemented method for capturing a representation of a data set, comprising:
    under the control of one or more computer systems configured with executable instructions,
        receiving an instruction from a client device to capture the representation of the data set at a point in time, the point in time based at least in part on a capture policy received from the client device; and
        responsive to at least the instruction to capture the representation of the data set:
            using a plurality of servers to perform data set operations in a plurality of distributed data set partitions;
            instructing one or more storage interfaces in communication with the plurality of servers to block acknowledgment of at least completion of one or more activities in connection with the data set; and
            at a time after the one or more storage interfaces blocks acknowledgment of at least the one or more activities, inserting a token into one or more request streams from the one or more storage interfaces to the servers, each token being an indication to a server that receives the token for performing a capture of a data set partition of the plurality of data set partitions upon processing the token during processing of a corresponding request stream into which the token has been inserted.

26. The computer-implemented method of claim 25, wherein the data set partitions are distributed among a plurality of physical storage devices.

27. The computer-implemented method of claim 25, wherein each request stream comprises a collection of requests for performing data operations from a corresponding computing device of the one or more storage interfaces to a corresponding server of the plurality of servers.

28. The computer-implemented method of claim 25, wherein, for each server, the request stream comprises a plurality of requests from the one or more storage interfaces for performing a data operation.

29. The computer-implemented method of claim 25, further comprising:
    receiving requests for performing data operations from the application; and
    for each of the requests from the application:
        selecting an appropriate storage interface that communicates with an appropriate server for causing completion of a requested operation; and
        causing the selected storage interface to communicate with the appropriate server to complete the requested operation.

* * * * *